(12) United States Patent
Boulter (10) Patent No.: US 8,636,267 B1
(45) Date of Patent: Jan. 28, 2014

(54) LAND BASED OR FLOATING WASTEWATER EVAPORATOR

(76) Inventor: Roger P. Boulter, Harlingen, TX (US)

( * ) Notice: Subject to any disclaimer, the term of this patent is extended or adjusted under 35 U.S.C. 154(b) by 0 days.

(21) Appl. No.: 13/472,240

(22) Filed: May 15, 2012

Related U.S. Application Data (63) Continuation of application No. 12/268,197, filed on Nov. 10, 2008, now Pat. No. 8,256,748, which is a continuation-in-part of application No. 11/859,024, filed on Sep. 21, 2007, now Pat. No. 7,448,600.

(60) Provisional application No. 60/896,411, filed on Mar. 22, 2007.

(51) Int. Cl.
*B01F 3/04* (2006.01)

(52) U.S. Cl.
USPC ............................. 261/28; 261/78.2; 159/4.4

(58) Field of Classification Search
USPC .................... 261/28, 30, 34.1, 78.2, DIG. 65; 159/4.4; 210/747.5, 747.9, 170.06, 210/170.08; 239/222.11
See application file for complete search history.

(56) References Cited

U.S. PATENT DOCUMENTS

| | | |
|---|---|---|
| 2,079,117 A | 9/1936 | R.R.Hayes |
| 3,610,567 A | 10/1971 | Stuck |
| 3,622,074 A | 11/1971 | Frohwerk |
| 3,669,422 A | 6/1972 | Nogaj |
| 3,785,558 A | 1/1974 | Albritton et al. |
| 3,998,389 A | 12/1976 | Rose et al. |
| 4,001,077 A | 1/1977 | Kemper |
| 4,409,107 A | 10/1983 | Busch |
| 4,449,849 A | 5/1984 | Horn et al. |
| 4,587,064 A | 5/1986 | Blum |
| 4,609,145 A | 9/1986 | Miller |
| 4,680,148 A | 7/1987 | Arbisi et al. |
| 4,681,711 A | 7/1987 | Eaton |
| 4,713,172 A | 12/1987 | Horn et al. |
| 4,762,276 A | 8/1988 | Foust |
| 4,906,359 A | 3/1990 | Cox, Jr. |
| 5,004,531 A | 4/1991 | Tiernan |
| 5,032,230 A | 7/1991 | Shepherd |
| 5,185,085 A | 2/1993 | Borgren |
| 5,227,067 A | 7/1993 | Runyon |
| 5,244,580 A | 9/1993 | Li |
| 5,381,742 A | 1/1995 | Linton et al. |
| 5,454,939 A | 10/1995 | Meuche |
| 5,499,490 A | 3/1996 | Minnich |
| 5,768,866 A | 6/1998 | Minnich |
| 5,783,084 A | 7/1998 | Suenkonis |
| 5,874,003 A | 2/1999 | Rose |
| 5,971,372 A | 10/1999 | Ash |
| 6,083,405 A | 7/2000 | Tanaka et al. |
| 6,182,463 B1 | 2/2001 | Strussion et al. |

(Continued)

FOREIGN PATENT DOCUMENTS

| | | |
|---|---|---|
| CN | 1820576 | 6/2007 |
| DE | 3425852 | 1/1986 |

(Continued)

*Primary Examiner* — Charles Bushey
(74) *Attorney, Agent, or Firm* — Patent Law Offices of Rick Martin, P.C.

(57) ABSTRACT

A plurality of atomizing fans are mounted on a portable land craft. A pump delivers pond water to the land craft to evaporate the pond water. A land based generator powers the pump and the atomizing fans. The entire system could be mounted on a single trailer.

8 Claims, 15 Drawing Sheets

(56) References Cited

U.S. PATENT DOCUMENTS

| | | |
|---|---|---|
| 6,190,498 B1 | 2/2001 | Blagborne |
| 6,272,874 B1 | 8/2001 | Keeney |
| 6,309,542 B1 | 10/2001 | Kim |
| 6,325,362 B1 | 12/2001 | Massey et al. |
| 6,348,147 B1 | 2/2002 | Long |
| 6,367,278 B1 | 4/2002 | Strussion et al. |
| 6,582,552 B1 | 6/2003 | Juhola |
| 6,637,379 B2 | 10/2003 | Hays et al. |
| 6,824,124 B2 | 11/2004 | Henley |
| 6,875,351 B2 | 4/2005 | Arnaud |
| 6,948,881 B1 | 9/2005 | Fredriksson et al. |
| 7,022,242 B2 | 4/2006 | Sacchi |
| 7,166,229 B2 | 1/2007 | Cote et al. |
| 7,210,637 B1 | 5/2007 | Johnson |
| 7,448,600 B1 * | 11/2008 | Boulter ............ 261/28 |
| 7,581,716 B2 | 9/2009 | Tsai |
| 7,604,710 B2 * | 10/2009 | Haslem et al. ............ 159/3 |
| 7,722,739 B2 * | 5/2010 | Haslem et al. ........... 159/4.07 |
| 8,256,748 B1 * | 9/2012 | Boulter ............ 261/28 |
| 2002/0079598 A1 | 6/2002 | Kedem et al. |
| 2003/0062004 A1 | 4/2003 | Hays et al. |
| 2004/0045682 A1 | 3/2004 | Liprie |
| 2004/0086816 A1 | 5/2004 | Hays et al. |
| 2006/0032797 A1 | 2/2006 | Tsai |
| 2006/0162349 A1 * | 7/2006 | Edwards et al. ............ 62/121 |

FOREIGN PATENT DOCUMENTS

| | | |
|---|---|---|
| DE | 29805795 | 3/1998 |
| DE | 298057950 | 3/1998 |
| ES | 2024097 | 6/1990 |
| ES | 2157798 | 8/2001 |
| GB | 190000085 | 4/1900 |
| JP | 55112987 | 9/1980 |
| JP | 5317877 | 12/1993 |
| JP | 7008987 | 1/1995 |
| JP | 08-108196 | 4/1996 |
| JP | 8108197 | 4/1996 |
| JP | 8108198 | 4/1996 |
| JP | 8108199 | 4/1996 |
| JP | 8244679 | 9/1996 |
| JP | 9253692 | 9/1997 |
| JP | 2003175394 | 6/2003 |
| RU | 2128317 | 3/1999 |
| RU | 2168133 | 5/2001 |
| RU | 2215960 | 11/2003 |
| TW | 533087 B | 9/2007 |

* cited by examiner

LAND BASED OR FLOATING WASTEWATER EVAPORATOR

CROSS REFERENCE APPLICATIONS

The application is a continuation claiming the benefits of U.S. application Ser. No. 12/268,197 issued as U.S. Pat. No. 8,256,748, filed Nov. 10, 2008 which is a continuation in part of application Ser. No. 11/859,024 filed Sep. 21, 2007, issued as U.S. Pat. No. 7,448,600 on Nov. 11, 2008, which claimed the benefit of provisional application No. 60/896,411 filed Mar. 22, 2007.

FIELD OF INVENTION

The present invention relates to using multiple high speed atomizing fans mounted on a floating or land based device to evaporate wastewater such as oil field production water or other water created from various oilfield operations.

BACKGROUND OF THE INVENTION

Drilling, completion operations and production operations for oil and gas often creates millions of gallons of wastewater. This wastewater is often pumped into a reservoir. The wastewater must be removed for continuous operations. Off-site disposal and trucking the wastewater is costly. Natural evaporation is slow and inefficient. What is needed is a cost efficient way to remove large quantities of wastewater with as minimal environmental impact as possible.

U.S. Pat. No. 4,499,849 (1984) to Horn et al. discloses oil drilling wastewater evaporator using a land based pump to spray via nozzles the water all around the edge of the reservoir back into the reservoir. A float can support a splashplate to increase the rate of evaporation from the land based nozzle.

The present invention provides a floating device or a land based conveyance such as a skid that supports over a dozen high speed atomizing fans. The floating device is tethered from the sides of the reservoir or anchored in the reservoir. The skid is dropped at the edge of the pond with a hose and a pump to reach the pond. Power (preferably hydraulic) is supplied from a land based power unit. Hydraulic fluid, once cycled for power to the fans and the water pump, is used to pre-heat the water, thereby adding efficiency to the entire system. This hydraulic fluid also is used to transport the land based engine cooling heat out to the unit. Another heat exchanger on the land based power unit removes the heat from the coolant and adds it to the oil coming back from the return lines before it goes to the storage tank. All the components can be mounted on a custom trailer to enable portability among several sites.

SUMMARY OF THE INVENTION

An aspect of the present invention is to provide a working floating device that carries a plurality of high speed atomizing fans to evaporate industrial wastewater safely into the air.

Another aspect of the present invention is to power the raft from a land based power unit, preferably hydraulic.

Another aspect of the present invention is to provide portability of the entire system on a trailer.

Another aspect of the present invention is to use the heat from the hydraulic fluid and engine cooling heat to pre-heat the wastewater.

Another aspect of the present invention is to provide a floating underwater pump inlet assembly having a screen and a variable depth mounting means.

Another aspect of the present invention is to provide a land based conveyance that carries the high speed atomizing fans and is parked next to the pond.

Other aspect of this invention will appear from the following description and appended claims, reference being made to the accompanying drawings forming a part of this specification wherein like reference characters designate corresponding parts in the several views.

A pontoon floating device has a support frame on top of the pontoons. A water inlet assembly is supported beneath the frame by a pair of extension rods having a selectable immersion depth. The circulating pump and (preferably) fourteen evaporator fans are (preferably) hydraulically powered from a land based diesel power lines to the raft at variable distances so that the raft can be positioned in a reservoir.

The evaporator fans are fed pre-heated wastewater using the spent hydraulic fluid and engine heat as a heat source. Piping for the pump and fans is supported on the frame.

The entire system is portable when mounted on a custom trailer. In use large volumes of wastewater are evaporated off the reservoir at an economically feasible cost.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
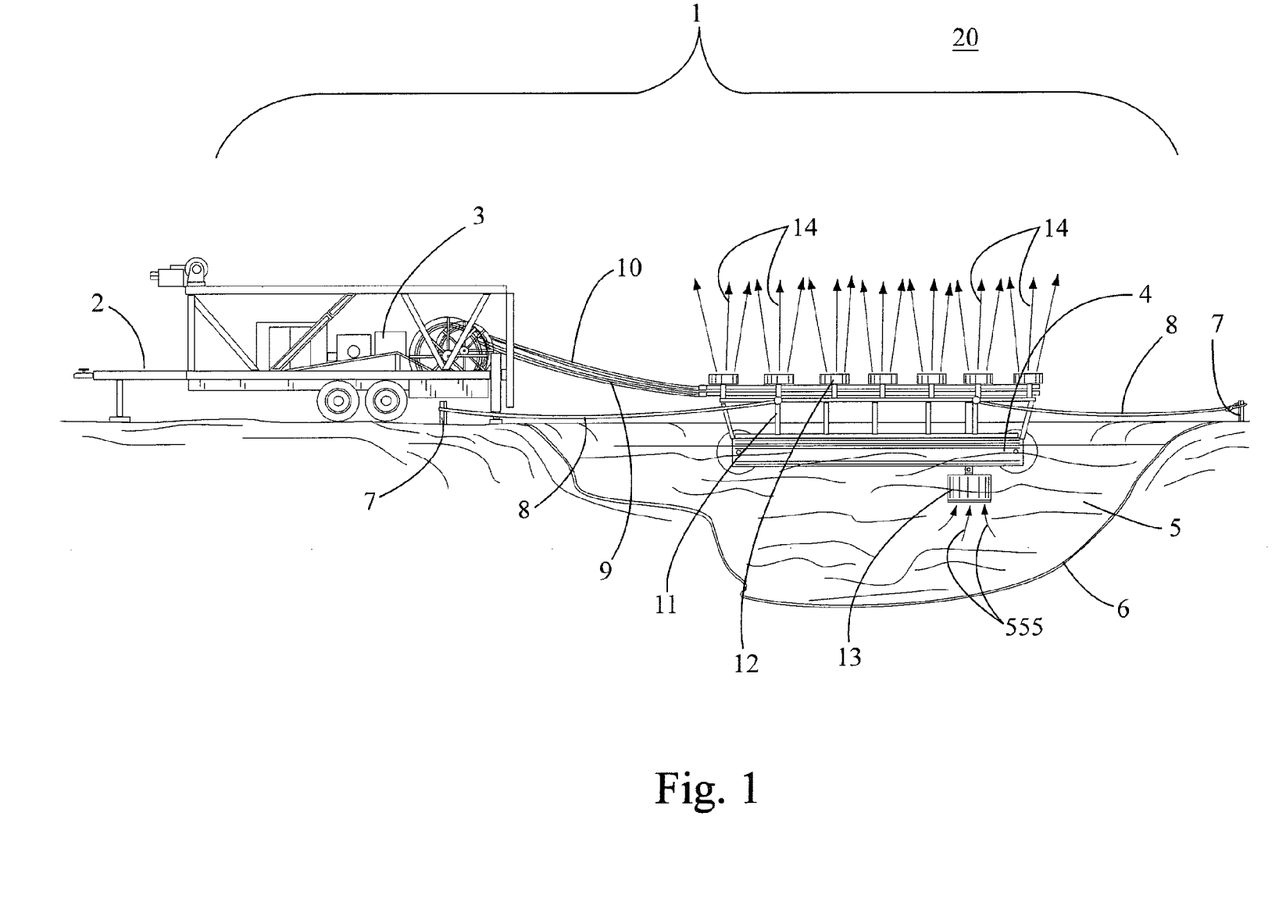
FIG. 1 is a perspective view of the entire system in use on a wastewater reservoir.

Referring first to FIG. 1 the evaporator system 1 comprises a trailer 2, a land based generator 3 and a raft 4. A wastewater reservoir 5 is generally lined 6. In use the raft 4 may be anchored to posts 7 with ropes 8. Hydraulic power lines 9 supply hydraulic power to the raft 4, and return lines 10 connect to the power unit return.

A frame 11 on the raft 4 supports (nominally) fourteen atomizing fans 12. In operation a pump inlet assembly 13 supplies wastewater 555 to the fans 12 which atomize the wastewater 555 into micro droplets 14. Thus, the wastewater 555 becomes evaporated into the atmosphere 20 in an environmentally friendly manner as the micro droplets 14 are evaporated into the atmosphere 20.

Figure 2:
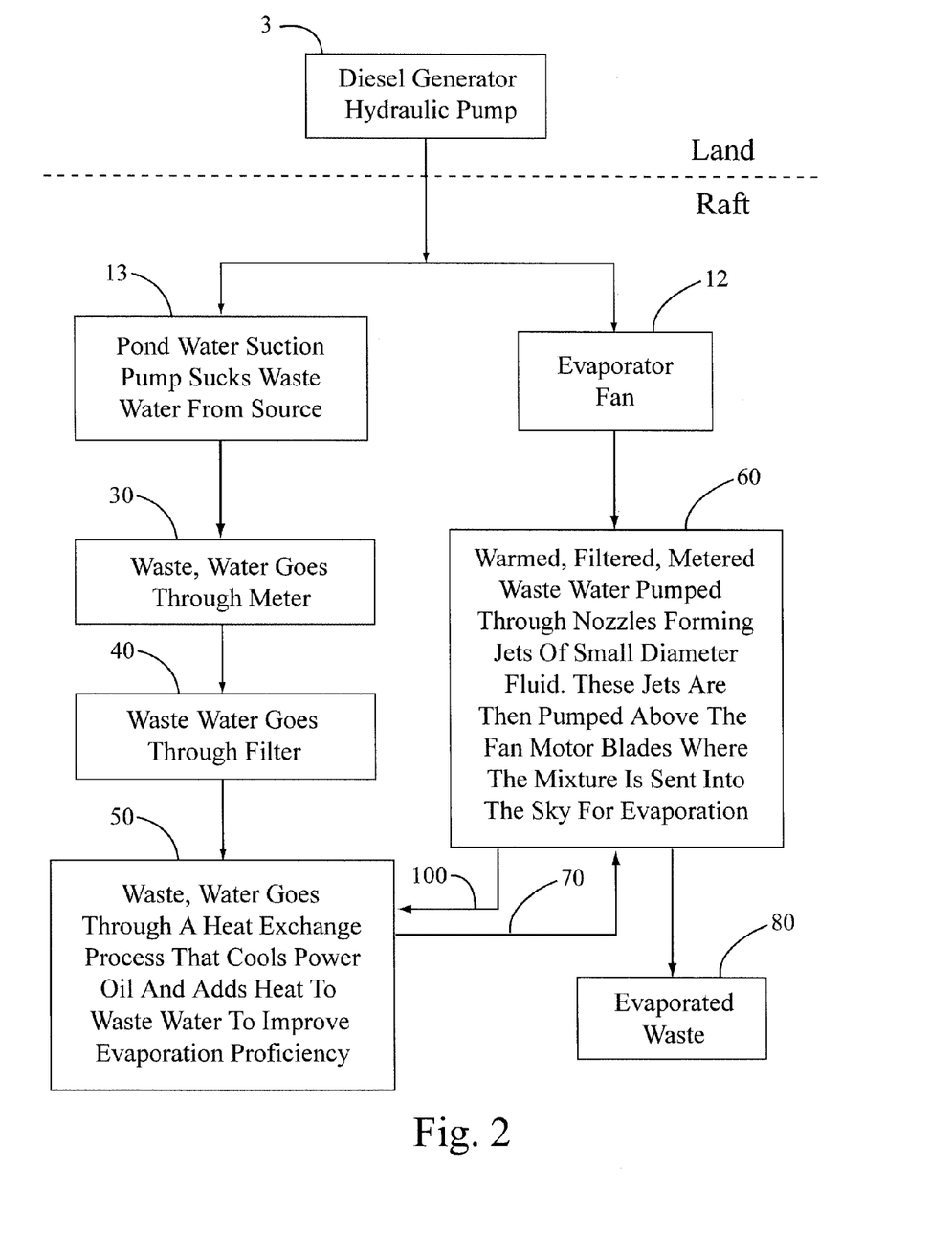
FIG. 2 is a functional flow chart of the system components.

Referring next to FIG. 2 the preferred power unit 3 consists of a diesel powered hydraulic pump. It powers the pump P which pulls wastewater 555 through the pump inlet assembly 13 and is filtered at 40 then through a water meter 30, then heated by the spent hydraulic fluid at 50 via pipes 100.

Next the water is sent to the evaporator fans at 60 via pipes 70. Finally, the fans evaporate the water to atmosphere at 80.

Figure 3:
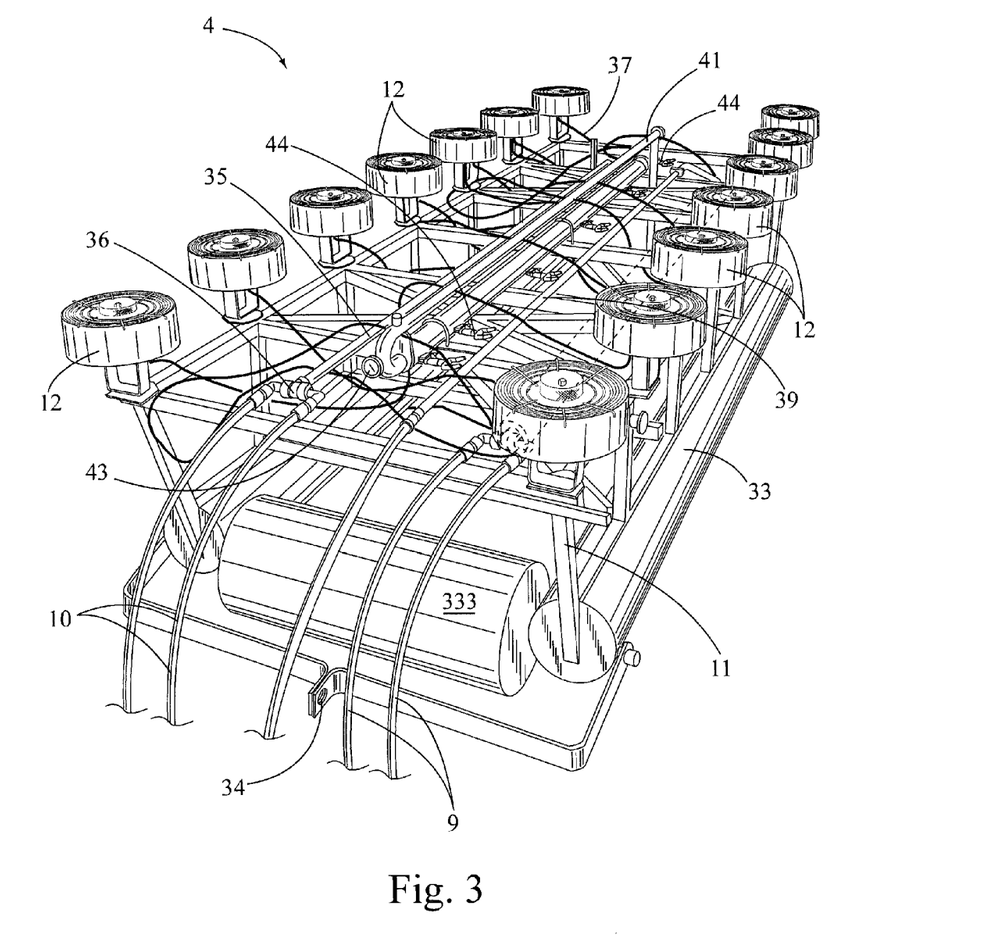
FIG. 3 is a front perspective view of the raft.
Figure 4:
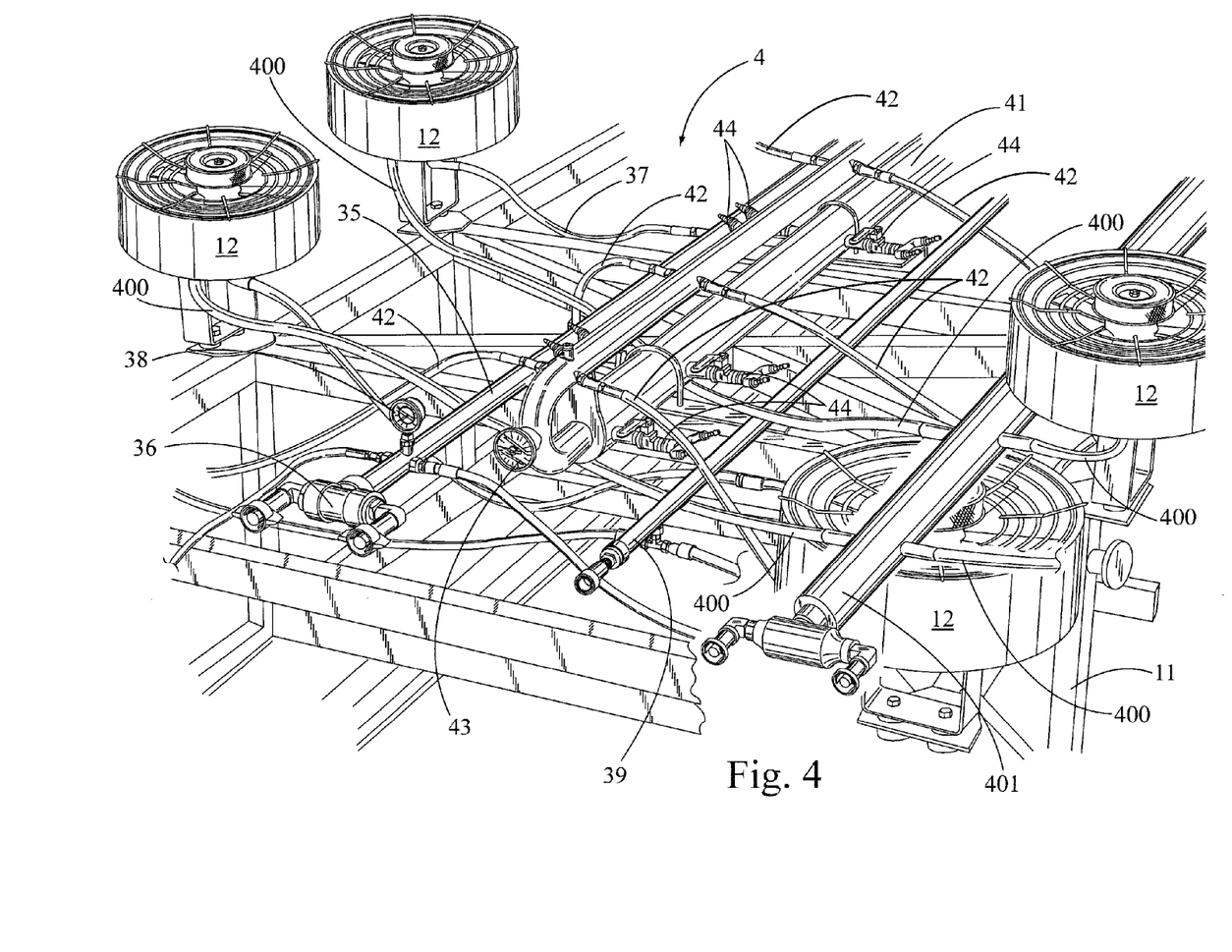
FIG. 4 is a top perspective view of the raft frame, piping and fans.

In FIGS. 3, 4 the floating device 4 can be towed at hitch 34. Two longitudinal pontoons 33 and two transverse pontoons 333 may be used to support the frame 11. Fourteen prior art fans 12 are used in the test craft. Two hydraulic lines 10 are fed into a supply manifold 35 via a Y connector 36. Each fan 12 has a hydraulic feed line 37. Gauge 38 indicates hydraulic manifold pressure. Hydraulic return lines 400 are fed to manifold 401 which then feeds return lines 10 of FIG. 1.

A hydraulic reservoir (not shown) is fed by drain line 39 to drain the hydraulic fan motors of excess hydraulic oil. The water pump P feeds a water manifold 41 wherein each fan 12 has water feed line 42. A gauge 43 indicates water manifold pressure. Hydraulic return lines 400 are fed to manifold L101 which then feeds return lines 10 of FIG. 1.

Figure 5:
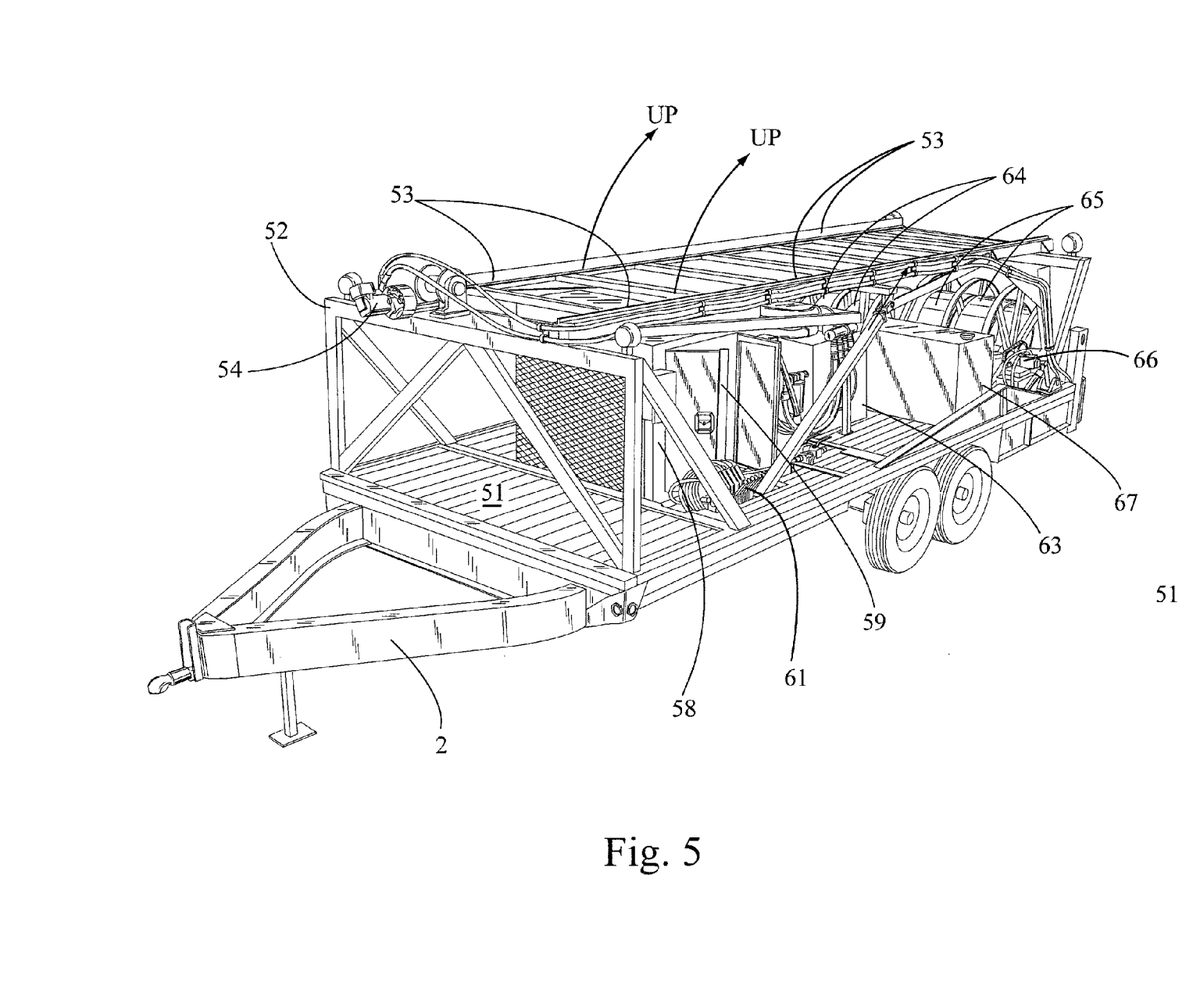
FIG. 5 is a front perspective view of the trailer loaded with the land system.

Referring next to FIG. 5 the trailer has a conventional set of wheels and a flat floor 51. A frame 52 supports a track 53 that can hold the floating device 4. Arrow UP show how the track 53 is hydraulic lifted at the front end to provide a ramp for the loading of the raft 4. A hoist motor 54 controls the loading/unloading of the raft 4 via a cable 101 shown in FIG. 10.

Figure 13:
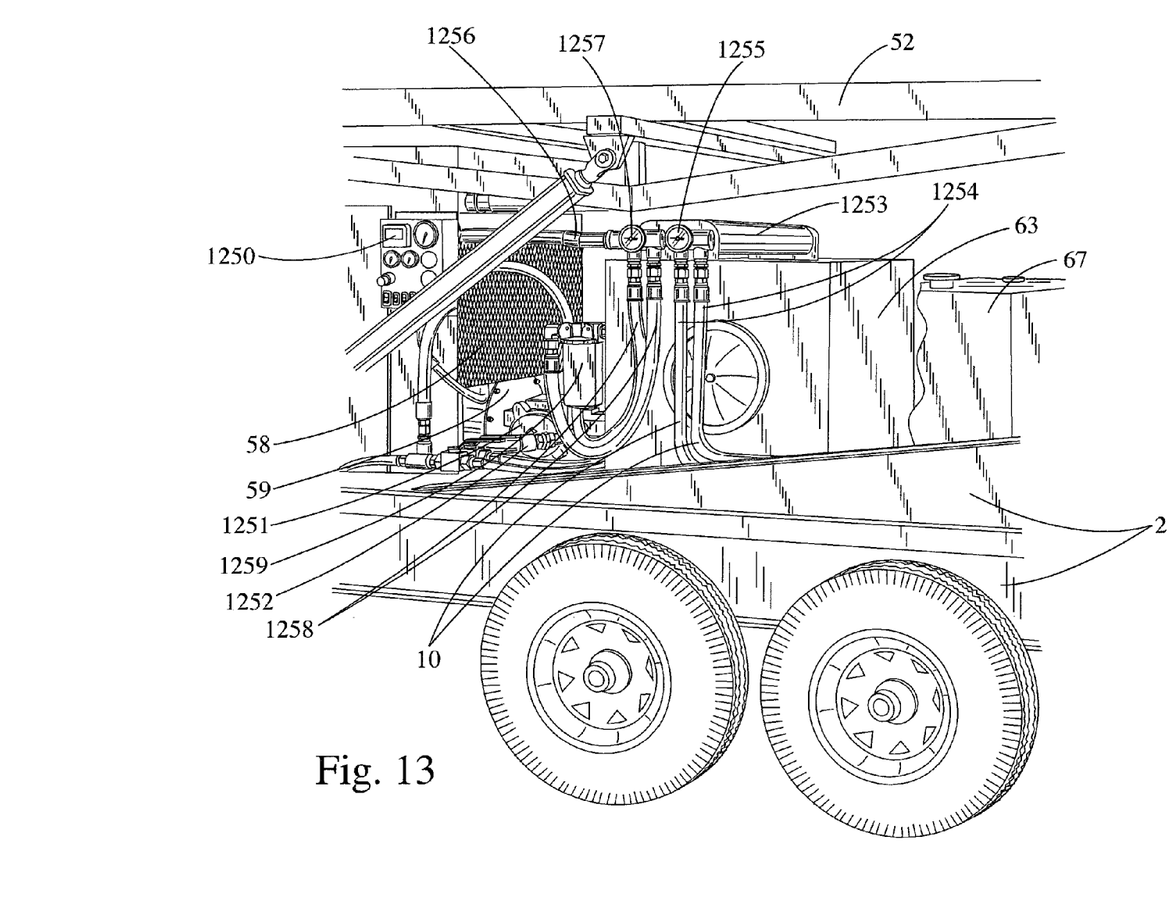
FIG. 13 is a side perspective view of the trailer's diesel engine, hydraulic power pump and heat exchanger.
Figure 14:
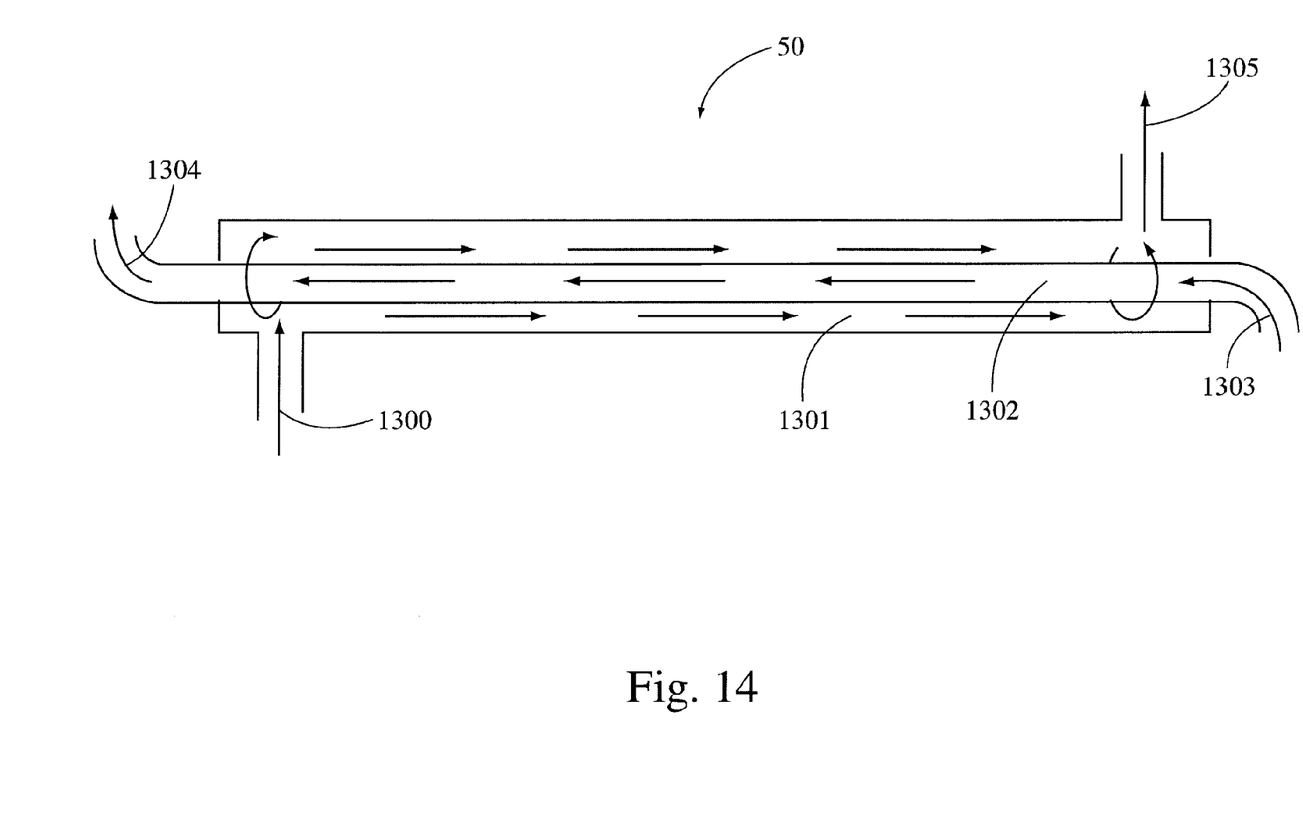
FIG. 14 is a schematic view of the watercraft mounted heat exchanger for the spent hydraulic fluid.

The diesel housing 58 protects a diesel engine 59. Hydraulic controls 61 control the lift 62 shown in FIG. 10 and the hydraulic fluid tank 63 and pump 1251 of FIG. 13 which powers the fans 12 and pump P. Hydraulic power reels 64 supports lines 10, and return reels 65 support the return lines 9. A reel motor 66 powers the reels 64, 65. Diesel fuel tank 67 is mounted to balance the trailer 2.

Figure 10:
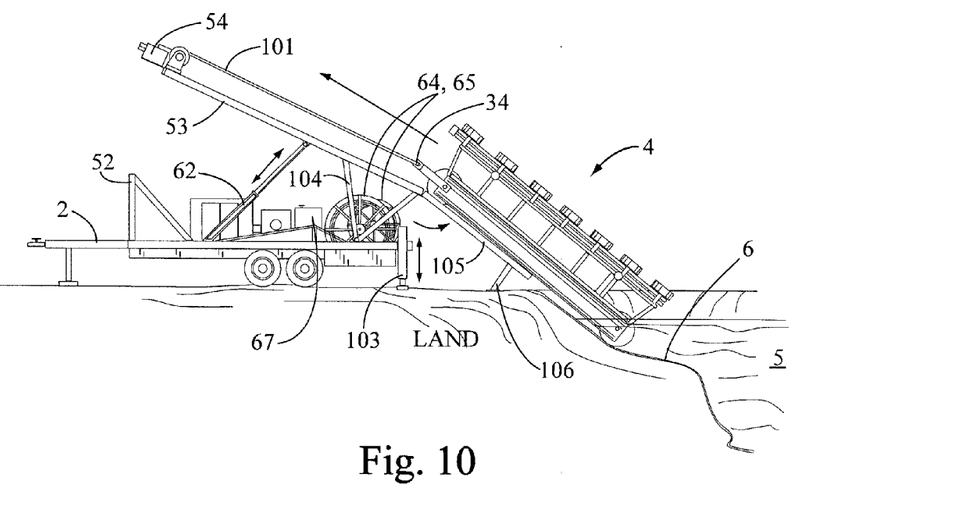
FIG. 10 is a side perspective view of the raft being loaded on top of the trailer.
Figure 11:
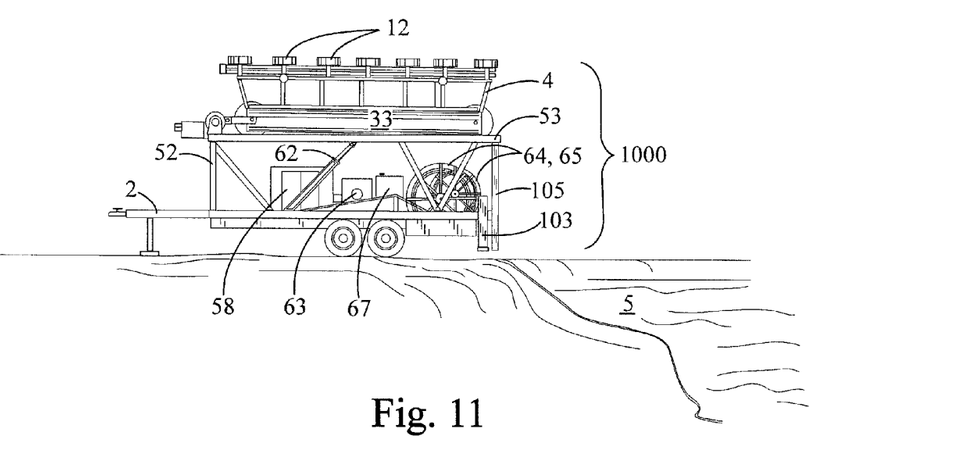
FIG. 11 is a side perspective view of the fully loaded trailer.
Figure 12:
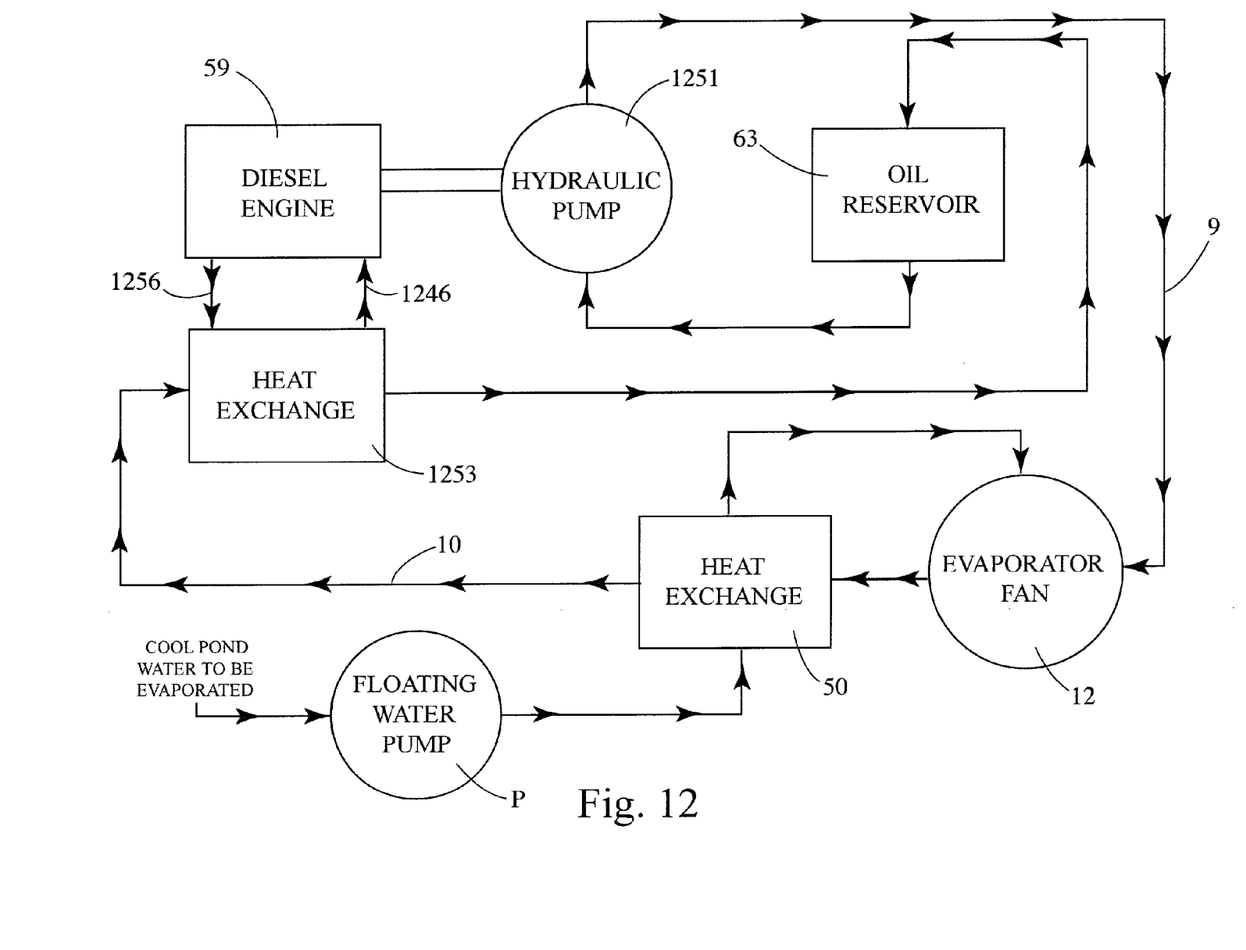
FIG. 12 is a flow chart of the diesel engine to hydraulic fluid heat exchange and pond water heat exchange systems.
Figure 15:
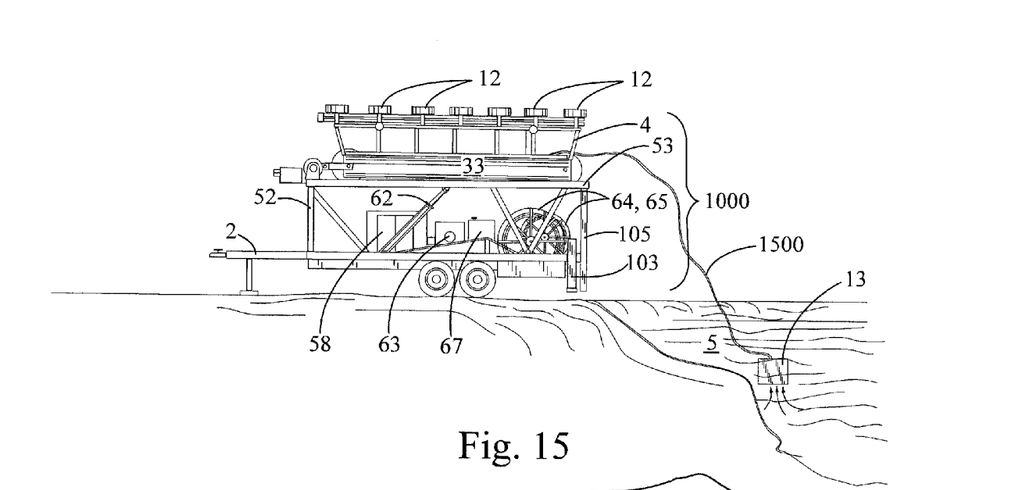
FIG. 15 is a side perspective view like FIG. 11 showing the raft and trailer equipment all operational by submersing the PUMP 13 and running a hose (FIG. 9 item 812) and hydraulic lines (FIG. 9 items 810, 811) to the raft.
Figure 16:
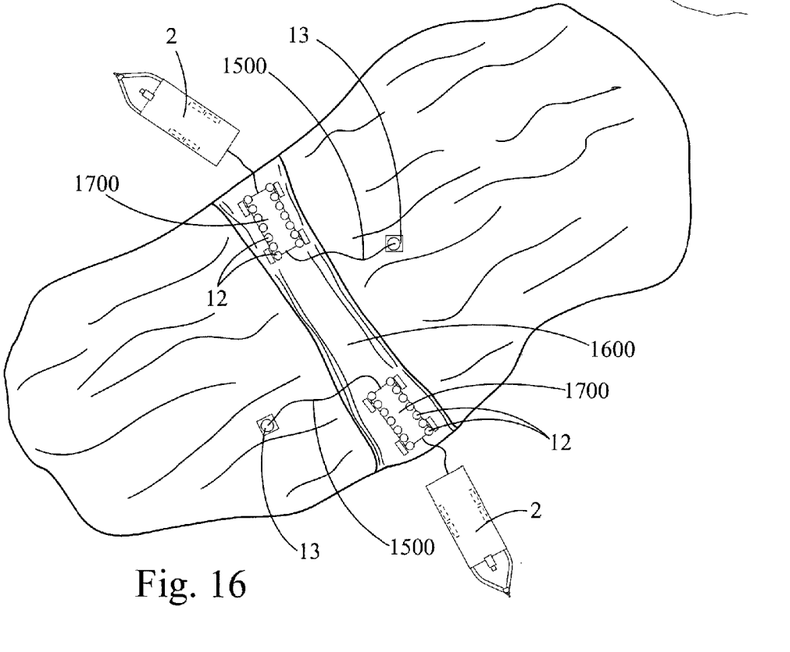
FIG. 16 is a top perspective view of a skid type land based only pumping station.
Figure 17:
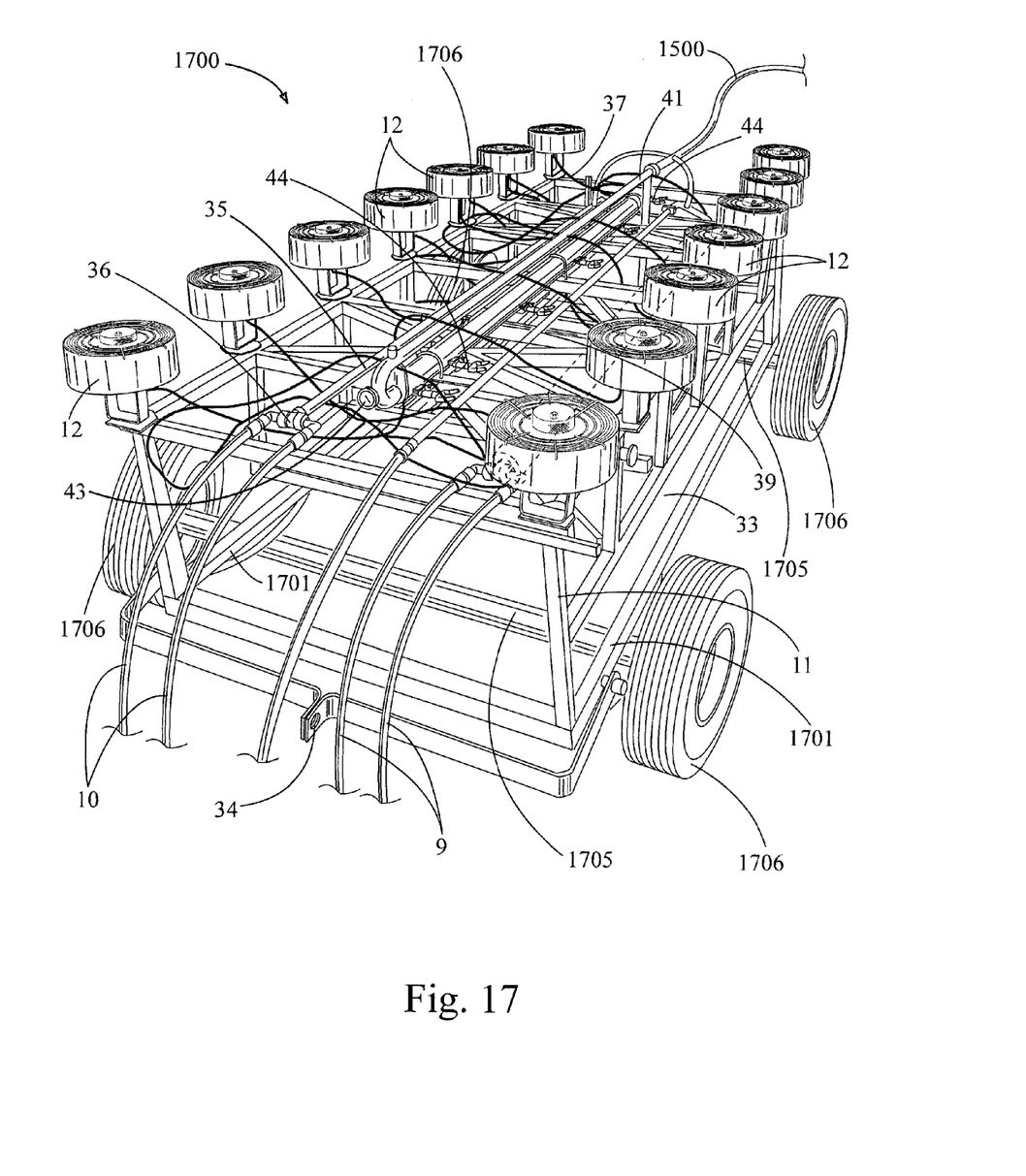
FIG. 17 is a top perpective view of a wheeled skid embodiment.

In FIG. 10 the hydraulic stabilizers 103 are set to support the weight of raft 4. A pivot assembly 104 supports the track 53 during the load/unload operation. A tailgate 105 and support 106 provide a ramp for the raft 4. In FIG. 11 the entire evaporator system 1000 is ready to move to another reservoir. Alternatively one skilled in the art can understand that the unit is operational as it stands so long as the pump inlet assembly 13 is submerged. See FIG. 15 for details.

Figure 6:
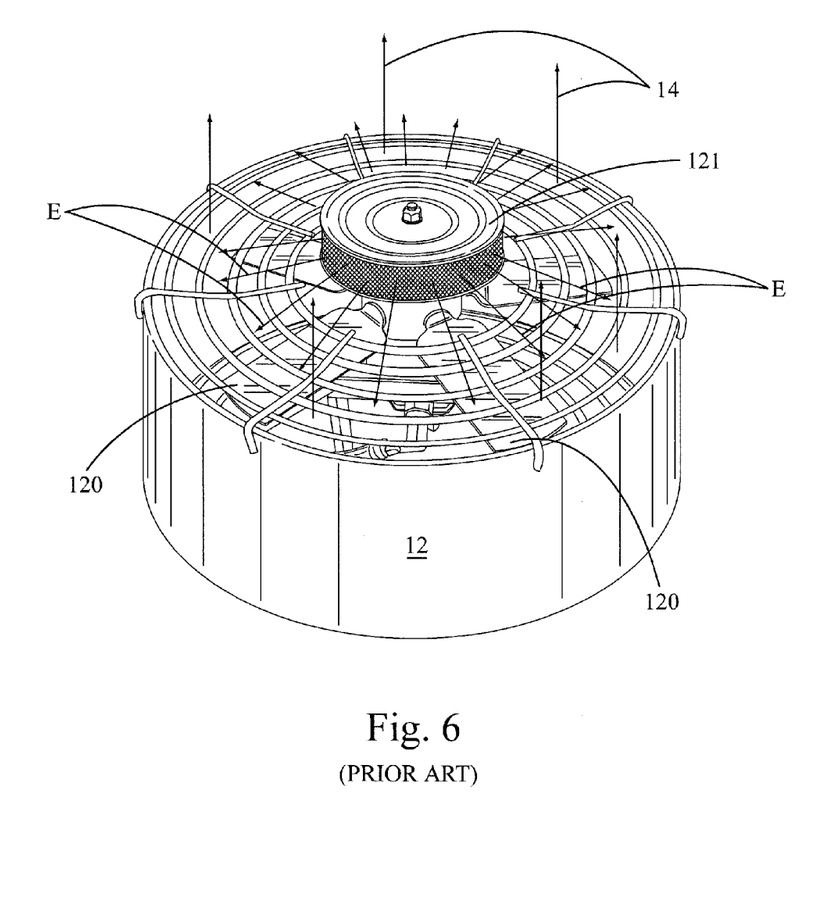
FIG. 6 (prior art) is a top perspective view of the operator fan.
Figure 7:
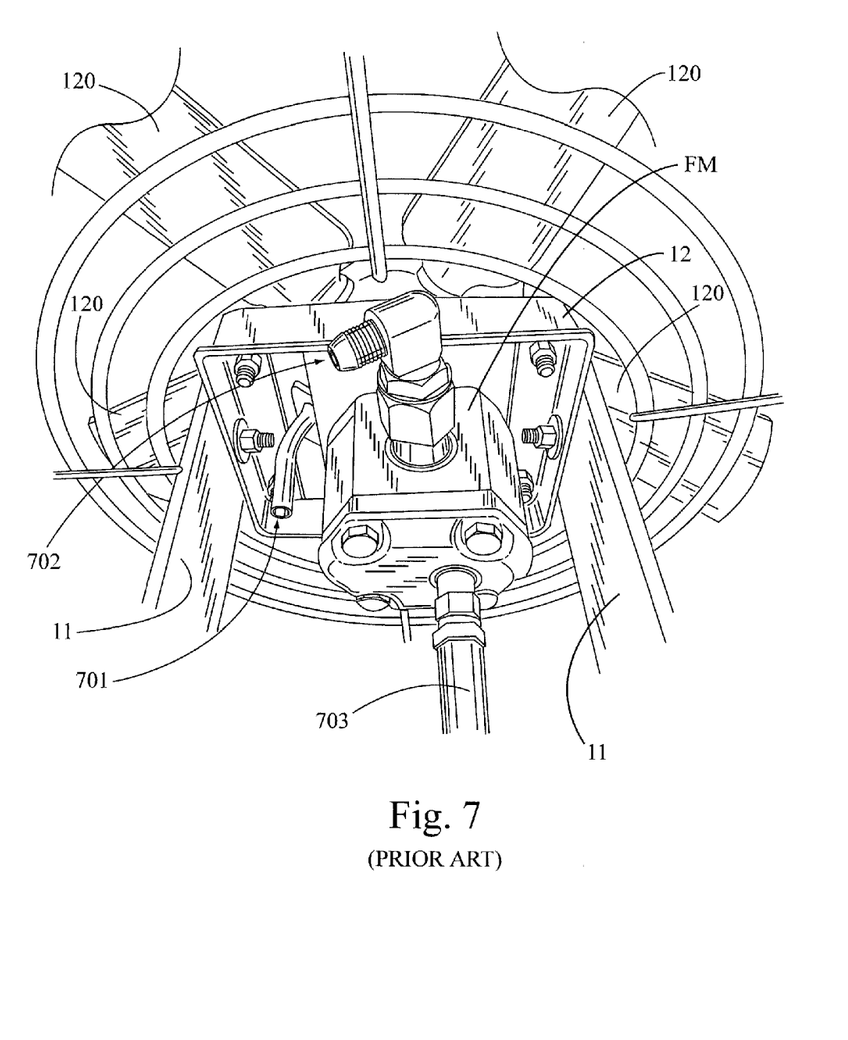
FIG. 7 (prior art) is a bottom perspective view of the evaporator fan.
Figure 8:
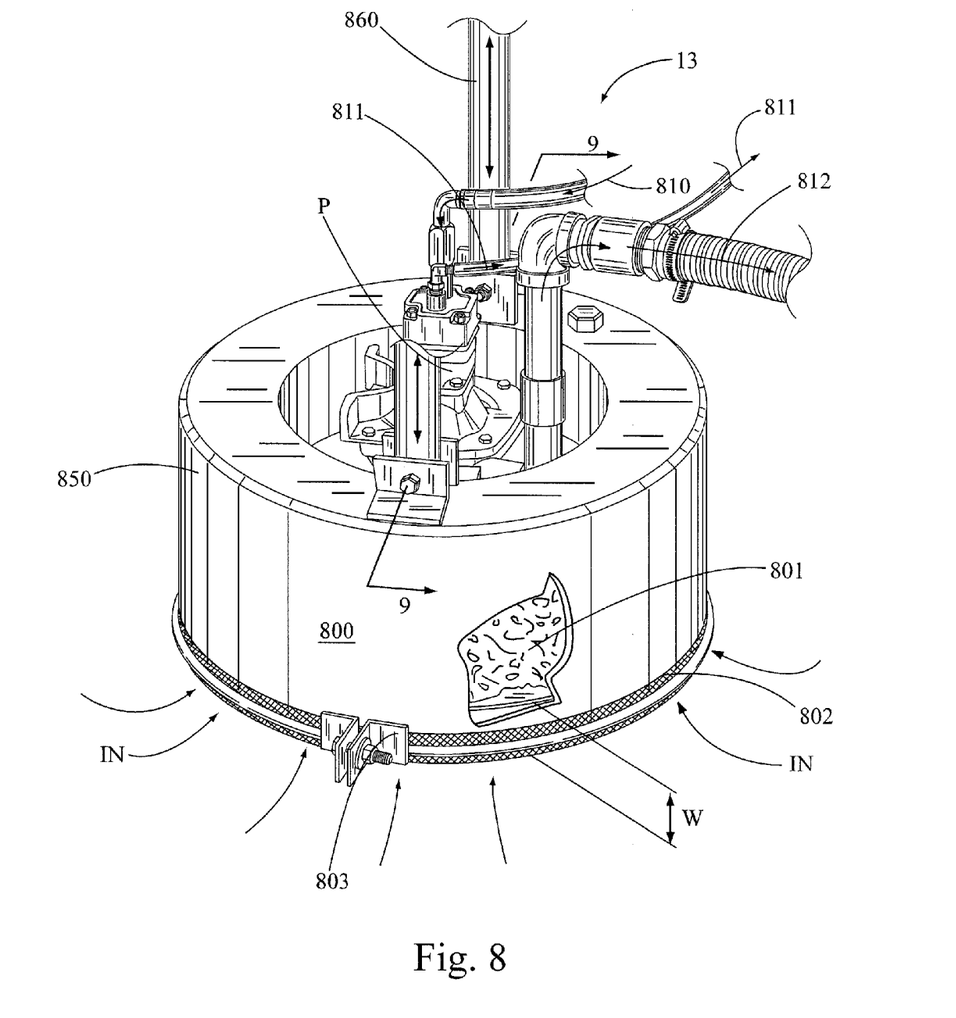
FIG. 8 is a top perspective view of the pump inlet assembly.
Figure 9:
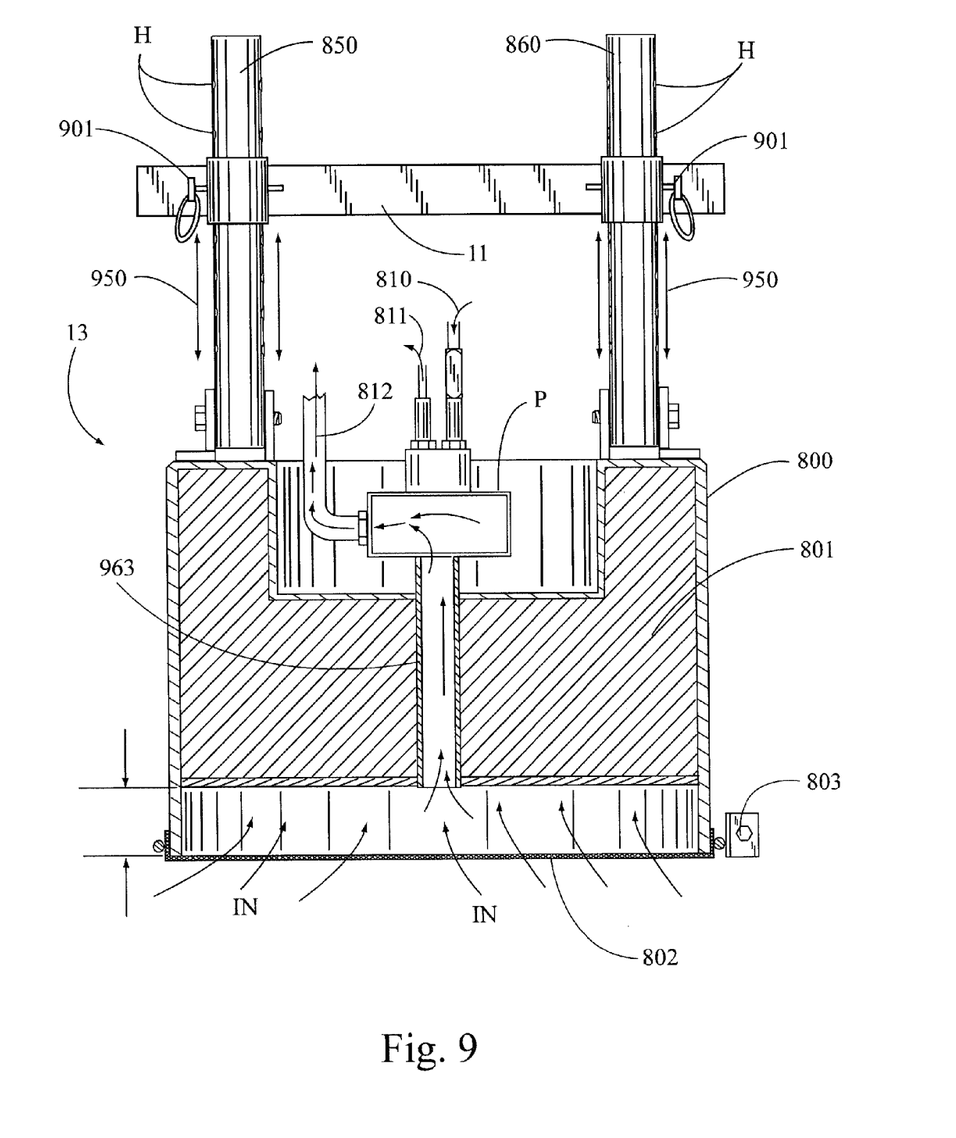
FIG. 9 is a cross sectional view of the pump inlet assembly taken along line 9-9 of FIG. 8.

Referring next to FIG. 6 (prior art) the fan 12 is preferably a Proptec™ made by Ledebuhr Industries, Inc. www.proptec.com. It is designed as a crop sprayer. A finned pitched blade 120 rotates at high speed to generate 10,000 (as per Ledebuhr) cubic feet per minute airflow.

A dissipater 121 ejects water out over the blade 120 as shown by arrows E. Micro droplets 14 are blown into the atmosphere.

FIG. 7 (prior art) shows the wastewater inlet 701 which connects to the dissipater 121 shown in FIG. 6. The fan motor FM receives hydraulic fluid at inlet 702 and returns the fluid in return 703.

Referring next to FIG. 8 the pump inlet assembly 13 has a casing 800 which covers a foam filled cavity 801. A screen 802 receives water shown by arrows IN. Nominally h=two inches. The screen 802 is serviceable via lock 803. The gap shown by h provides a vortex breaker design to prevent air from being sucked in which would cause the pump to lose its prime. The pump P is powered by hydraulic line 810 with return line 811. The wastewater outlet 812 supplies the manifold 41 shown in FIG. 4.

Support rods 850, 860 are used to manually set the assembly 13 at a desired depth for continuous, unattended operation. These support rods actually stop the float when the water level falls to a predetermined level below the point where the pump float will not float anymore.

FIG. 9 shows the rods 850, 860 having mounting holes H for locking pins 901. Arrows 950 show the up/down adjustability of the depth of the assembly 13. An inlet pipe 963 feeds the screened wastewater to the pump P.

In FIG. 12, the pond water pump P sends pond water to the heat exchanger 50 shown in detail in FIG. 14. After heating the pond water in heat exchanger 50, the spent hydraulic fluid passes through return lines 10 shown in FIG. 1. Lines 10 connect to heat exchanger 1253 shown in FIG. 13. Heat exchanger 1253 receives hot coolant water from diesel engine 50 via line 1256. This coolant water is returned to the diesel engine via line 1246. The diesel engine 59 drives the hydraulic pump 1251.

The spent hydraulic fluid in line 10 goes to heat exchanger 1253 and then to oil reservoir 63 on the trailer 2 shown in FIG. 13. The hydraulic pump 1251 pressurizes this heated fluid and sends it via line 9 to the raft 4.

FIG. 13 shows the trailer 2 supporting a diesel engine 59, diesel engine housing 58, and diesel controls 1250. The diesel engine turns the main hydraulic pump 1251, sending hydraulic fluid to the high pressure manifold 1252. This manifold 1252 feeds lines 9 of FIG. 1.

The return hydraulic lines 10 of FIG. 1 are shown piped to the heat exchanger 1253 at junction 1254. Incoming fluid pressure is indicated at gauge 1255. The heat exchanger is heated by diesel coolant line 1256. The exiting fluid temperature is indicated at gauge 1257. The exiting heated fluid is piped at 1258 through filter 1259 to hydraulic reservoir 63. From the reservoir 63 the heated fluid is fed to the main hydraulic pump 1251 and to line 9.

FIG. 14 depicts the watercraft mounted heat exchanger 50. This heat exchanger pre-heats the water from the pond/water reservoir 5 of FIG. 2 before it is sent to the fans 12 of FIG. 2.

Water inlet 1300 receive water from pump P of FIG. 8. A chamber 1301 circulates the water from inlet 1300 around a pipe 1302 which is heated by spent hydraulic fluid from oil inlet 1303. This spent hydraulic fluid is drawn from the manifold 401. Heated water exit port 1305 supplies the pond water to the fans 12.

Referring next to FIG. 15 the trailer 2 and raft 4 are operational as parked next to the pond 5. The pump 13 is submerged. Hydraulic lines and a water hose are carried in connecting hose 1500.

In FIG. 16 the trailers 2 are parked at each end of a burm 1600. Burm 1600 separates Pond A from Pond B. The skids 1700 are powered by their respective trailers 2. The skids 1700 are parked on land with connecting hoses 1500 serving Ponds A and B.

In the FIG. 17 the skid 1700 may have beams 1701 instead of the pontoons 33 and 333 of FIG. 3. Wheels (optional) 1706 are supported by axles 1705 connected to the beams 1701. All systems are the same as shown in FIG. 3. The wastewater connection from connection hoses 1500 attaches to the water manifold 41. The pump hydraulic connect to manifolds 35, 401 via the connecting hoses 1500.

Although the present invention has been described with reference to preferred embodiments, numerous modifications and variation can be made and still the result will come within the scope of the invention. No limitation with respect to the specific embodiments disclosed herein is intended or should be inferred. Each apparatus embodiment described herein has numerous equivalents.

I claim:

1. A transportable evaporator system comprising:
   a land craft having a pump to propel fluid from a body of fluid via a hose connected to the land craft directly without a holding tank to dissipaters mounted directly above each of a plurality of onboard atomizing fans;
   each of said dissipaters producing a micro droplet mist;
   said atomizing fans powered by a land based generator which is transportable on a trailer which is capable of also transporting the land craft;
   each of said atomizing fans rotating at a high speed to generate about 10,000 cubic feet per minute airflow; and
   said system not having a separate evaporation chamber or a heater for the fluid.

2. The apparatus of claim 1, wherein the land craft is a skid which does not have telescoping masts.

3. The apparatus of claim 1, wherein the land craft and the land based generator are mounted together on a trailer.

4. The apparatus of claim 1, wherein the pump is submersible.

5. The apparatus of claim 1, wherein the atomizing fans share a common fluid inlet manifold.

6. The apparatus of claim 1, wherein the pump is powered by the land based generator.

7. The apparatus of claim 1, wherein each dissipater can be controlled to vary the micro droplet mist size from 40 microns to greater than 250 microns.

8. The apparatus of claim 7, wherein each of said atomizing fans can evaporate up to 10 GPM.

\* \* \* \* \*